United States Patent [19]
Goto et al.

[11] Patent Number: 6,086,809
[45] Date of Patent: Jul. 11, 2000

[54] METHOD OF FORMING A BELT/BELT SLEEVE AND A BELT/BELT SLEEVE MADE USING THE METHOD

[75] Inventors: Shigeo Goto; Yoshiki Matsuura, both of Kagawa, Japan

[73] Assignee: Mitsuboshi Belting Ltd., Kobe, Japan

[21] Appl. No.: 09/121,485

[22] Filed: Jul. 23, 1998

[30] Foreign Application Priority Data

Jul. 24, 1997 [JP] Japan ................................. 9-215604
Jul. 24, 1997 [JP] Japan ................................. 9-215605

[51] Int. Cl.[7] ................................................ B29C 35/00
[52] U.S. Cl. .................... 264/257; 156/138; 156/140; 156/141; 264/103; 264/258; 264/326; 425/34.2
[58] Field of Search .................... 264/257, 258, 264/236, 103, 324, 325, 326; 156/137, 138, 139, 140, 141; 425/34.2

[56] References Cited

U.S. PATENT DOCUMENTS

| | | |
|---|---|---|
| 3,250,653 | 5/1966 | Geist et al. . |
| 4,695,269 | 9/1987 | Tassone et al. . |
| 4,813,919 | 3/1989 | Nosaka et al. . |
| 4,952,261 | 8/1990 | Nosaka et al. ........................... 156/138 |
| 5,882,473 | 3/1999 | Tanaka et al. ........................... 156/138 |

FOREIGN PATENT DOCUMENTS

| | | |
|---|---|---|
| 718148 | 12/1968 | Belgium . |
| 763874 | 8/1971 | Belgium . |
| 239334 | 9/1987 | European Pat. Off. . |
| 1164652 | 3/1964 | Germany . |
| 3202473 | 11/1983 | Germany . |
| 3406123 | 8/1985 | Germany . |
| 123750 | 10/1978 | Japan . |

*Primary Examiner*—Mathieu D. Vargot
*Attorney, Agent, or Firm*—Wood, Phillips, VanSanten, Clark & Mortimer

[57] ABSTRACT

A method of forming a belt/belt sleeve having a length and teeth spaced lengthwise of the belt/belt sleeve. The method includes the steps of providing a cylindrical cloth having a sewn joint; providing a mold having an axis, a circumference, and a plurality of axially extending grooves spaced around the circumference of the mold; extending the cylindrical cloth around the mold; providing a rod; pressing the rod against the cloth at the sewn joint so as to urge the sewn joint into one of the axially extending grooves; separating the rod from the cloth; and forming at least one belt component around the cloth on the mold after the rod is separated from the cloth.

18 Claims, 4 Drawing Sheets

METHOD OF FORMING A BELT/BELT SLEEVE AND A BELT/BELT SLEEVE MADE USING THE METHOD

BACKGROUND OF THE INVENTION

1. Field of the Invention

This invention relates to a method of forming toothed belts/belt sleeves which have a cloth layer disposed on a surface thereof. The invention is also directed to a belt/belt sleeve made according to the inventive method.

2. Background Art

Conventional toothed belts have a body with an inside and an outside. Teeth are formed on the inside of the body and are commonly made from chloroprene rubber. Load carrying cords, which are embedded in the body, are made from glass fiber cord or aramid fiber cord, commonly processed with an adhesive resorcinol-formalin-latex (RFL) liquid with an SBR-based vinylpyridine latex component. A cover canvas having crimped nylon in the weft yarns covers the teeth. This type of belt is commonly used as an overhead cam (OHC) driving belt for automobiles.

The cover canvas typically has a joint with free edges which are joined through either a hot-melt procedure or by machine sewing. The latter typically forms a stronger joint. With more compact automobiles being designed with small engine compartments and front engine and front drive design, OHC toothed drive belts are commonly subjected to higher temperatures. The hot-melt joining is thus not preferred in that it may not produce a strong enough joint. Thus, for this environment, the belts with machine-sewn joints are more commonly used.

Belts with machine-sewn joints have some potential problems. If the joint is located at the valleys or edges of the teeth, the joint may be stretched, ultimately to the point that the canvas opens up, exposing the underlying rubber and thereby making the belt prone to cracking.

In JP-B Hei-3-18821, one proposed solution to this problem is disclosed. The belt sleeve, from which the individual belts are cut, is produced by inserting a wire into the joint on a cylindrical canvas cloth on the inner surface of the cloth. The cylindrical cloth is then placed around a mold. A cord is then wrapped around the cloth after which the wire is removed. Unvulcanized rubber is applied over the cloth wrapped with the cord, and thereafter vulcanized.

With machine-sewn joints, the strength of the joint may vary, depending on, for example, the toughness of the canvas cloth and the potential change in the feed range (change in the slip ratio), which is affected by the surface condition of the canvas cloth. As a result, the strength may vary, even though all the other conditions remain the same. Sewing that is too strong or too weak may cause failure in the cloth, and ultimately the belt rubber.

For example, if the joint is too strongly sewn, the joint may protrude from the cloth. The protruded joint may embed in the teeth. This location may be the starting point for cracking in relatively early stages of the belt life.

On the other hand, if the joint is weakly sewn, the joint may open up, depending upon its location on the mold. With the joint on the projecting portions of the mold, there is less a tendency to stretch. However, with the joint located in the mold grooves, the joint tends to open under the flow of rubber into the mold. Unvulcanized rubber may bleed through the joint. Early failure of the belt may originate at this location. Additionally, the belt may tend to creak at the joint location as it is wound around a pulley.

SUMMARY OF THE INVENTION

The invention is directed to a method of forming a belt/belt sleeve having a length and teeth spaced lengthwise of the belt/belt sleeve. The method includes the steps of providing a cylindrical cloth having a sewn joint; providing a mold having an axis, a circumference, and a plurality of axially extending grooves spaced around the circumference of the mold; extending the cylindrical cloth around the mold; providing a rod; pressing the rod against the cloth at the sewn joint so as to urge the sewn joint into one of the axially extending grooves; separating the rod from the cloth; and forming at least one belt component around the cloth on the mold after the rod is separated from the cloth.

The step of forming at least one belt component around the cloth may involve the step of wrapping a load carrying cord around the cloth.

The step of forming at least one belt component may involve the steps of applying unvulcanized rubber around the cloth and vulcanizing and molding the unvulcanized rubber.

The step of providing a rod may involve the step of providing an elongate rod having a rigid construction.

The rod may further have a rounded cross section and an angled tip portion.

In one form, the sewn joint is formed from thread and the method further includes the step of placing the rod between the thread and the cloth before pressing the rod against the cloth.

The step of forming at least one belt component may involve the steps of applying unvulcanized rubber around the cloth, placing a vulcanizing jacket around the mold with the unvulcanized rubber around the cloth, and vulcanizing the unvulcanized rubber.

The unvulcanized rubber may be vulcanized by heating the unvulcanized rubber under pressure.

The step of pressing the rod may involve the step of pressing the rod through the use of a pressing machine.

The method may further include the step of heating the rod at least one of a) prior to pressing the rod against the cloth and b) as the rod is pressed against the cloth.

The mold may have a locating hole. The method may include the step of directing the rod into the locating hole.

The method may further include the step of directing the rod axially within the one of the axially extending grooves and within the locating hole.

The step of providing a cylindrical cloth may involve the step of providing a cylindrical cloth which has a resistance value for the rod being inserted between the thread and the cloth of 1–5 kg.

The step of providing a rod may involve the step of providing a rod that is at least one of a metal wire and a resin.

The step of providing a rod may involve the step of providing a rod having a length that is approximately equal to the axial extent of the one of the axially extending grooves.

The one of the axially extending grooves has a cross-sectional area. The step of providing a rod may involve the step of providing a rod having a cross-sectional area equal to from 5–50% of the area of the one of the axially extending grooves.

The invention is also directed to a belt/belt sleeve having a body with a length, an inside, an outside, and teeth on the inside of the body and spaced lengthwise of the body. The belt/belt sleeve further has a cylindrical cloth layer on the inside of the body over the teeth and at least one rubber layer outside of the cloth layer. A load carrying cord is embedded in the at least one rubber layer. The cylindrical cloth layer has a sewn joint. During belt formation, the cylindrical cloth layer is extended around a mold having an axis, a circumference, and a plurality of axially extending grooves spaced around the circumference of the mold. The belt/belt sleeve is formed by pressing a rod against the cloth at the sewn joint so as to urge the sewn joint into one of the axially extending grooves, with the rod being separated from the cylindrical cloth layer before forming the at least one rubber layer and wrapping the load carrying cord around the mold.

The cylindrical cloth may be one of a plain, twill, and satin fabric made from fiber that is at least one of aramid fiber, polyamide fiber, polyester fiber, and polyvinyl alcohol fiber.

The sewn joint may be sewn with thread that is at least one of twisted filament yarns and monofilament yarns that are at least one of polyamide, polyester, polypropylene, and aramid.

The cylindrical cloth may be pre-treated with at least one of an RFL liquid isocyanate solution and epoxy solution.

DETAILED DESCRIPTION OF THE DRAWINGS

Figure 1:
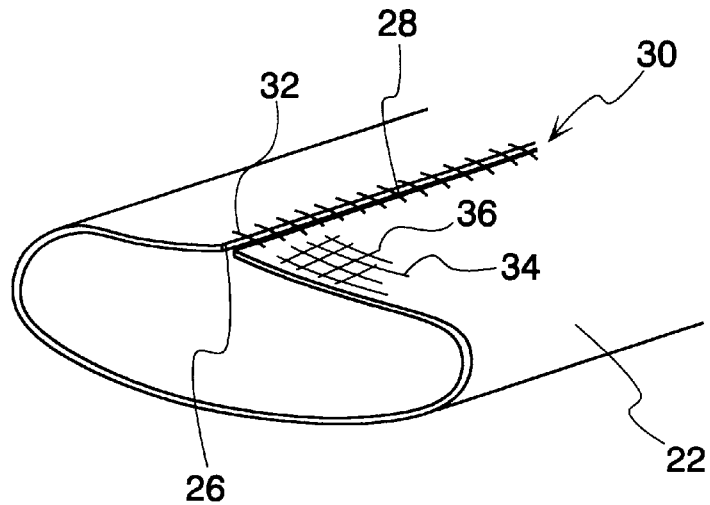
FIG. 1 is a fragmentary, perspective view of a cylindrical canvas cloth used to practice the invention and having edges thereon sewn with thread to produce a joint.

In FIGS. 1–9 and 11, a method of forming a toothed power transmission belt, according to the present invention, is illustrated. An exemplary belt, made using the inventive process, is shown at 10 in FIG. 10.

The belt 10 has a body 12 with an inside 14, an outside 16, and a length in the direction of a double-headed arrow L. Load carrying cords 18 are embedded in the body 12 and define a neutral axis for the belt 10. Teeth 20 are defined on the inside of the belt body 12 and are spaced regularly along the belt length. Canvas cloth 22 covers the inside surface of the belt body 12, including the teeth 20 and grooves 24 therebetween.

If should be understood that the inventive process can be used to form individual belts 10 or a belt/belt sleeve from which the individual belts 10 are cut. Accordingly, throughout the description herein, reference will be made to formation of a "belt/belt sleeve".

The canvas cloth 22 is initially formed into a cylindrical shape by abutting edges 26, 28 thereon at a joint 30. The joint 30 is machine sewn using thread 32. The canvas cloth may be plain fabric, twill fabric, satin fabric, or the like. Weft yarns 34, which extend in a lengthwise direction on the completed belt 10, may be made from aramid fiber, polyamide fiber, such as 6 nylon, 6,6 nylon, 12 nylon, etc., polyester fiber, polyvinyl alcohol fiber, and the like. The weft yarns 34 are preferably multi-filament yarns of para-aramid fiber which may be used alone or combined with meta-aramid fiber.

In one form, the weft yarns 34 are twisted yarns made from three different yarns that are para-aramid multi-filament yarn, meta-aramid spun yarn, and elastic urethane yarn. In another form, the weft yarns 34 are formed by twisting three different yarns that are para-aramid multi-filament yarn, aliphatic fiber yarn, such as 6 nylon, 6,6, nylon, polyester, polyvinyl alcohol, etc., and elastic urethane yarn.

The warp yarns 36 may be made from at least one of aramid filament yarns made from para-aramid fiber or meta-aramid fiber, and polyamide, polyvinyl alcohol or polyester filament yarn such as 6 nylon, 6,6, nylon, 12 nylon, or the like.

The warp yarns 36 are preferably made from aramid filament yarns, with the weft yarns 34 preferably made from para-aramid multi-filament yarns. With this preferred construction, the canvas cloth layer 22 may be made with a uniform thickness and suitable stiffness.

The para-aramid multi-filament yarn described above may be prepared by gathering a plurality of yarn bundles each having a plurality of filaments with a size from 0.3 to 1.2 denier, or by bundling a plurality of filaments each having sizes from 0.3 to 1.2 denier. Products suitable for this purpose are currently sold commercially under the trademarks KEVLAR™, TECHNORA™ and TWARON™.

If the size of the yarn filaments is less than 0.3 denier, the tensile strength of the canvas cloth layer 22 in the lengthwise direction of the belt 10 may be inadequate. Further, abrasion resistance of the belt 10, where in contact with a cooperating pulley, may be inadequate.

If the size of the yarn filaments is greater than 1.2 denier, and if the canvas cloth layer 22 is processed with an adhesive, the stiffness of the para-aramid multi-filament yarns in the canvas cloth 22 may be too great to keep a balance between the weft yarns 34 and warp yarns 36. As a result, the canvas cloth 22 may have a non-uniform thickness and may become wrinkled. This makes the resulting canvas cloth 22 unacceptable for use in toothed belts which are required to have a uniform PLB value.

Preferably, the weft yarns 34 are made from para-aramid multi-filament yarns which make up 20–80% of the total weight of the weft. If the amount of the yarns is less than 20 weight percent, the tensile strength of the canvas cloth 22 in the lengthwise direction of the belt 10 may be undesirably low so that the teeth 20 may fail with the belt 10 run under high load.

If the amount of the yarns is greater than 80 weight percent, the stiffness of the canvas cloth 22 in the direction of the weft yarns 34 becomes too great, as a result of which the canvas cloth 22 may not have a uniform thickness, as described above.

The thread 32 used to form the joint 30 is preferably machine sewn. The thread 32 may consist of twisted filament yarns or monofilament yarns of polyamide, polyester, polypropylene, aramid, or the like, such as 6 nylon, 6,6 nylon, 12 nylon, etc.

The canvas cloth 22 is pre-treated with an RFL liquid, isocyanate solution, or epoxy solution. The RFL solution is prepared by mixing a precondensate of resorcinol and formalin with latex, in which the latex may be any of styrene-butadiene-vinylpyridine ter-copolymer, hydrogenated nitrile rubber, chlorosulfonated polyethylene, or epichlorohydrin.

The strength of the cylindrical canvas cloth 22 is identifiable by the resistance value of a rod 38 being inserted between the thread 32 and the canvas cloth 22 at the joint 30. It is preferred that the resistance value be between 1–5 kg. As one example, to measure the resistance value, a stainless steel rod 38 is used. The rod 38 has a tip 40 which is formed to an acute angle, a length of from 200–500 mm, and a diameter of from 1–3 mm. The rod 38 is welded to a tension gauge and pressed along the length of the joint 30. The rod 38 is directed between the thread 32 and canvas cloth 22 for a length of 100–400 mm, with the maximum mechanical resistance value measured with the tension gauge.

With the machine sewing strength being small, the mechanical resistance value is small. With the machine sewing strength being large, the mechanical resistance value is large.

If the mechanical resistance value is less than 1 kilogram, the thread 32 may stretch, as a result of which unvulcanized rubber may bleed through the joint 30 during the vulcanization process. If the resistance value is larger than 5 kg, the joint 30 tends to protrude. This protruding joint 30 may become embedded into the teeth 20 during belt formation. This serves as a location which may precipitate early failure of the belt 10.

Figure 2:
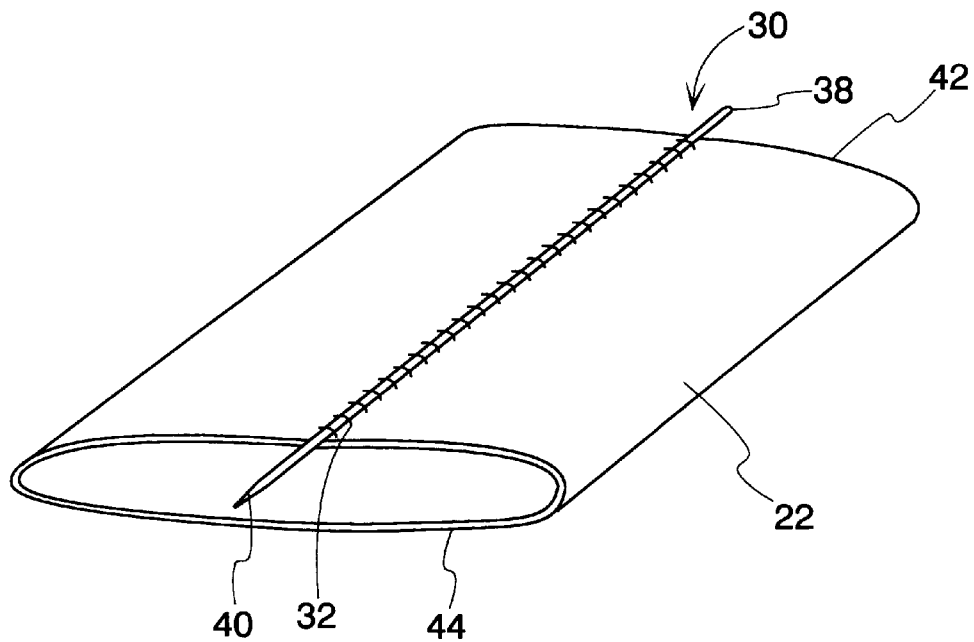
FIG. 2 is a perspective view of the canvas cloth with a rod inserted between the thread and the canvas cloth at the joint.
Figure 3:
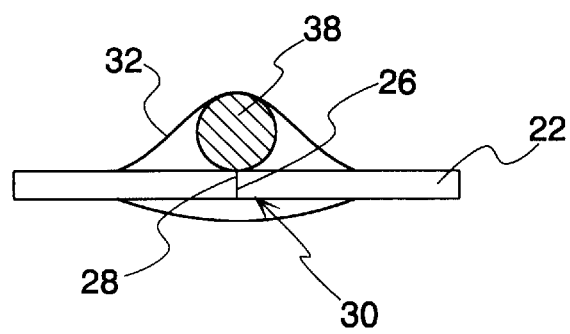
FIG. 3 is an enlarged, fragmentary, end view of the rod inserted between the thread and canvas cloth at the joint as in FIG. 2.
Figure 4:
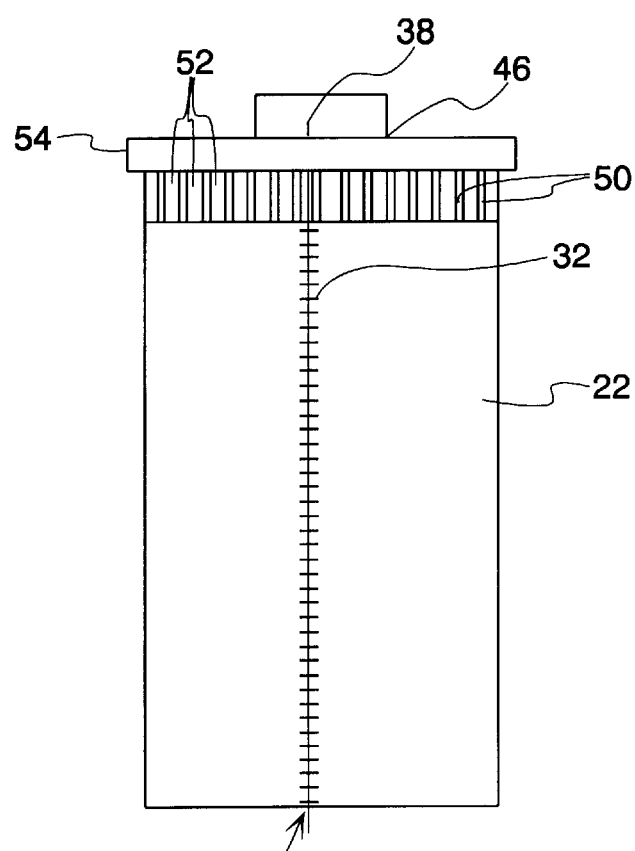
FIG. 4 is a front elevation view of a mold having the canvas cloth, with the rod inserted therein, fitted therearound, and with the rod extending into a groove and a locating hole within the mold.
Figure 5:
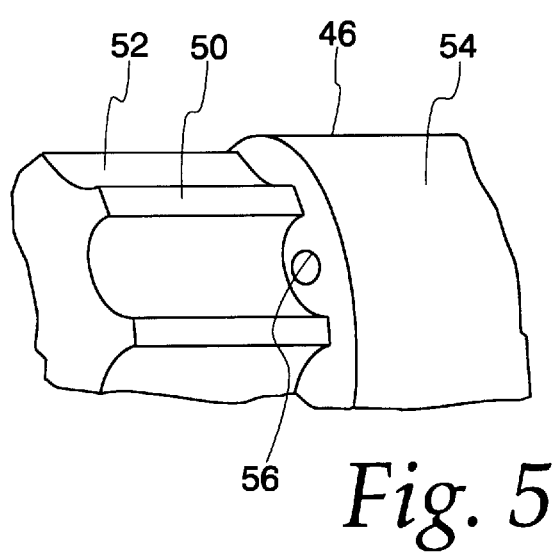
FIG. 5 is an enlarged, fragmentary, perspective view of a part of the mold and showing a locating hole for the rod.

In FIGS. 2–4, the rod 38 is shown inserted between the thread 32 and canvas cloth 22. The rod 38 is preferably made from a rigid material and may be, for example, a thin, elongate wire or resin rod. The tip 40, as previously described, may be formed to an acute angle to facilitate its insertion. The cross section of the rod 38 is preferably round, and may be, for example, circular or oval. The rod 38 is preferably directed between the thread 32 and canvas cloth 22 over the entire axial extent of the canvas cloth 22, between the axial edges 42, 44 thereof.

In FIG. 4, the canvas cloth layer 22, with the rod 38 inserted, is shown fit around a mold 46. The mold 46 has a central axis 48 and axially extending projections 50 and grooves 52 alternating around the circumference of the mold 46. The rod 38 is situated to reside within one of the grooves 52. The rod 38 thus accurately positions the joint 30 in a mold groove 52.

To accurately locate the rod 38, an enlarged flange 54 on the mold 46 may be provided with an axially extending locating hole 56. These locating holes 56 may be provided at regular intervals in circumferential alignment with the grooves 52 to facilitate consistent rod location within a groove 52. The rod tip 40 can be directed into and fully through a locating hole 56 to project axially from the flange 54.

The cross-sectional area of the rod 38 is preferably from 5–50% of the cross-sectional area of the mold groove 52. If the cross-sectional area is less than 5%, the canvas cloth 22 may not be formed sufficiently into the groove 52 as the rod 38 is pressed into the groove 52, as hereafter described. As a result, upon the introduction of the rubber into the groove 52, substantial deformation of the canvas cloth 22 may occur during vulcanization. If this occurs, there may be tendency of unvulcanized rubber to bleed through the joint 30.

If the cross-sectional area of the rod 38 is greater than 50% of the area of the groove 52, the rod 38 may be difficult to insert between the thread 32 and the canvas cloth 22. Further, as the thickened rod 38 is pressed between the thread 32 and canvas cloth 22, the thread 32 tends to elongate. The resulting joint 30 may, as a result, be deformed or may fail.

Figure 6:
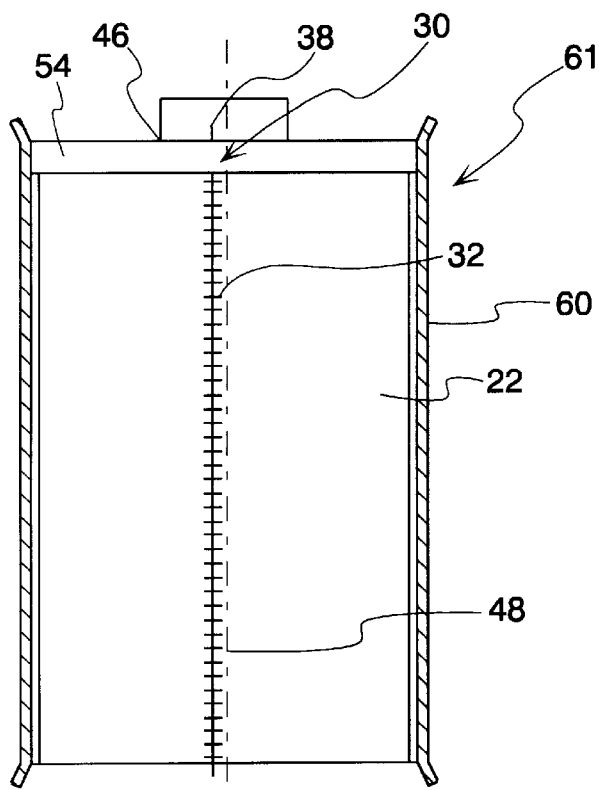
FIG. 6 is a front elevation view, partially in cross section, showing a vulcanizing jacket surrounding the mold with the canvas cloth wrapped therearound and with the rod in the locating hole.
Figure 7:
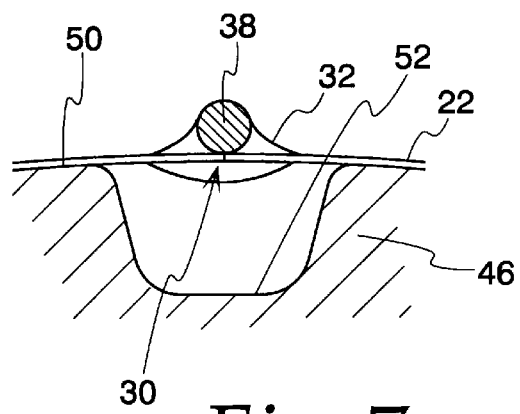
FIG. 7 is a view as in FIG. 3 with the joint located on the mold in circumferential alignment with a groove on the mold.

In FIG. 6, a cylindrical jacket 60 is fit surroundingly on the mold 46 with the canvas cloth 22 thereon. The entire subassembly 61 in FIG. 6 is placed into a vulcanizer. In the vulcanizer, the canvas cloth 22 is subjected to heat and pressure, as a result of which the rod 38 is pressed radially inwardly, thereby drawing the canvas cloth 22 into the groove 52 to form a pre-mold. In this initial pressing step, the temperature is preferably in the range of 150–165° C. The pressing time may be 5–10 minutes, with an external pressure applied between 3–15 kg/cm$^2$.

The hot pressing step facilitates the thermal deformation of the canvas cloth 22. However, it is intended that the adhesive and rubber which are adhered to the mold 46 remain uncured and unvulcanized. If any adhesive and rubber is cured and vulcanized, the adhesion between the canvas cloth 22 and rubber, which has flowed into the mold grooves 52, may be poor during the vulcanization step.

After removing the subassembly 61 from the vulcanizer, it is cooled with water, or the like, at the inside of the mold 46, after which the rod 38 is removed.

Figure 11:
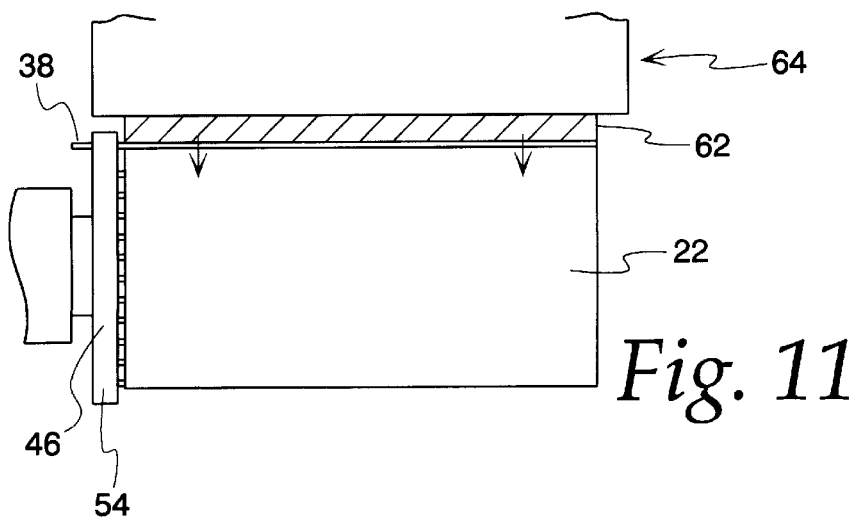
FIG. 11 is an elevation view of a pressing machine urging the rod at the joint in the canvas cloth into a groove on the mold.

As an alternative processing step, a hot plate 62, on a pressing machine 64, as shown in FIG. 11, may be urged against the rod 38 to press the rod 38 and canvas cloth 22 into one of the grooves 52. The rod 38 is projected through the flange 54 before the pressing step occurs.

During the pressing step using the pressing machine 64, the temperature is preferably between 150–165° C. The rod 38 is pressed between 1 and 5 minutes with an external pressure applied of between 0.5 and 10 kg/cm$^2$. The hot pressing facilitates the deformation of the canvas cloth 22 and is such as not to cure or vulcanize the adhesive or rubber on the mold 46. As explained above, if this condition occurs, the adhesion between the canvas cloth 22 and rubber in the grooves may be compromised during the vulcanization step.

Figure 8:
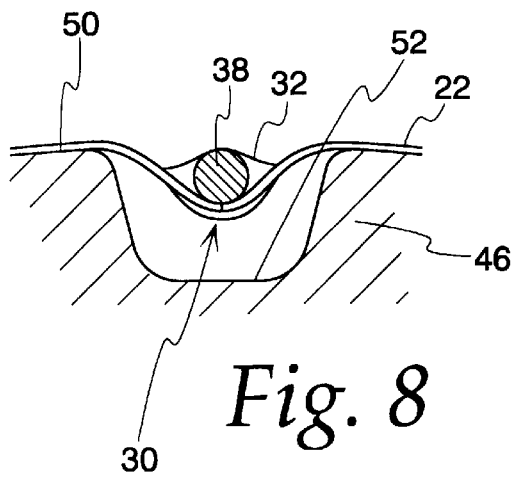
FIG. 8 is a view as in FIG. 7 with the rod and joint region urged radially inwardly into the mold groove.

With either process, the rod 38 urged into the groove 52, as shown in FIG. 8.

It is also possible to press the rod 38 into the grooves 52 to thereby deform the canvas cloth 22 at room temperature, without heating the rod 38.

Figure 9:
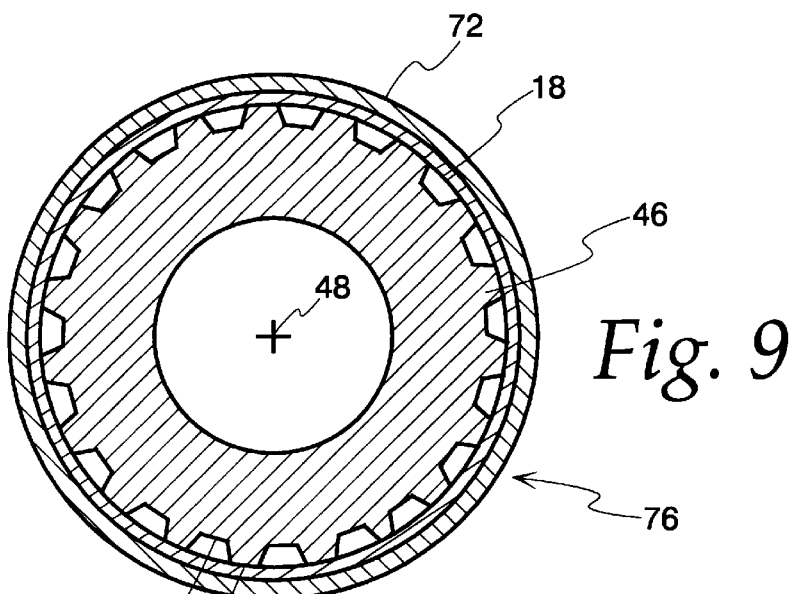
FIG. 9 is a cross-sectional view of the mold with load carrying cords and an unvulcanized rubber layer formed around the mold.
Figure 10:
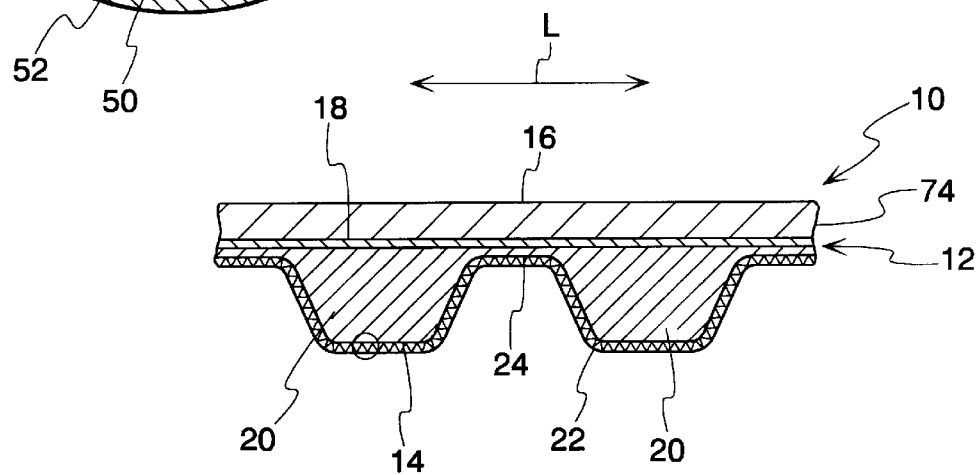
FIG. 10 is a fragmentary, cross-sectional view of a toothed belt, made according to the present invention.

As shown in FIG. 9, a glass fiber or aramid fiber cord 18 is wound around the canvas cloth 22 on the mold 46. An unvulcanized rubber layer 72 is then formed around the cord 18 and molded to define the teeth 20 and a tension layer 74 (FIG. 10).

The jacket 60 is then placed around the mold 46 with the components 18, 72 built thereon and placed in a vulcanizing device. During vulcanization, rubber in the layer 72 passes through the canvas cloth 22 into the grooves 24 to form the teeth 20.

The vulcanized belt sleeve 76, which results, is removed from the mold 46 and trained around two spaced shafts on a cutting machine. With a conventional cutter on the cutting machine, the belt sleeve 76 is cut while being rotated under tension to produce individual belts 10 of a predetermined width.

The rubber in the layer 72 is preferably one which has good thermal aging resistance. Suitable rubbers are hydrogenated nitrile rubber, hydrogenated nitrile rubber with a metal salt of an unsaturated carboxylic acid added thereto, chlorosulfonated polyethylene (CSM), alkylated chlorosulfonated polyethylene (ACSM), chloroprene rubber, etc.

The hydrogenated nitrile rubber preferably has a degree of hydrogenation of not less than 80%, and more preferably not less than 90%, to exhibit good heat and ozone resistance. Hydrogenated nitrile rubber having a degree of hydrogenation of less than 80% may exhibit poor heat and ozone resistance.

By pre-forming the canvas cloth 22 at the joint 30, the rubber in the layer 72 is not required to cause the degree of deformation of the cloth 22, as occurs in the absence of the pre-form steps, during vulcanization. By reducing the force exerted at the joint 30 during vulcanization, the joint 30 is less prone to being altered during vulcanization, as may lead to bleeding or failure.

The invention is described below relative to working examples.

INVENTIVE EXAMPLE 1

The belt 10 was made with a warp yarn 36 having a 200 denier filament yarn made by bundling 1.5 denier para-aramid fiber filaments. The weft yarn 34 was made with a bundled yarn consisting of two yarns of TECHNORA™-200D and 1 yarn of CORNEX™ No. 30 and SPUNDEX-140D, and a single yarn of TECHNORA™-200D. The canvas cloth 22 was a 2/2 twill-woven canvas with 110 yarns per 5 cm in the warp 36 and 120 yarns per 5 cm in the weft 34. The cloth 22 was vibrated in water and shrunk to have a width of about ½ its original width. A processing liquid was prepared by dissolving a hydrogenated nitrile rubber composition in methyl ethyl ketone. Isocyanate was added to the composition. The cloth 22 was dipped in the processing liquid and dried. The resulting cloth 22 had a thickness of 0.9 mm. The canvas cloth 22 was incorporated into the belt 10 with its weft 34 aligned in the lengthwise direction of the belt 10.

The canvas cloth 22 was cut to a predetermined length, with the edges butt-joined and machine sewn with a monofilament yarn of 6 nylon. The feeding speed of the canvas cloth was controlled during sewing, to produce the cylindrical shape. A wire rod 38 having a 2.5 mm diameter and a length of 1200 mm was inserted between the thread/yarn 32 exposed at the outer surface of the canvas cloth 22 and the outer surface of the canvas cloth 22.

To form the load carrying cords 18, approximately 200 glass fiber filaments, having a diameter of 9 $\mu$m, were prepared by melt spinning and surface treating with a silane coupling agent. The fiber filaments were bundled into a strand. Three such strands were collected without twisting and dipped in RFL. The resulting yarn was dried at 130° C. for two minutes and then heated at 250–300° C. for two additional minutes. The yarn was twisted 12 times per 10 cm in the S direction and in the Z direction (primary twist) to prepare an S-twisted and a Z-twisted yarn.

Thirteen of the S-twisted yarns were gathered and twisted 8 times per 10 cm in the Z direction (final twist) to prepare the load carrying cord 18. Additionally, 13 Z-twisted yarns were collected and twisted 8 times per 10 cm in the S direction (final twist) to prepare a glass fiber cord 18. The cords 18 were dipped in an overcoating liquid that was prepared by dissolving a rubber composition in a solvent and adding an isocyanate. The overcoating liquid was then dried. The overcoating liquid enhanced adhesion of the fiber cords to the rubber in the belt body 12.

The canvas cloth 22 with the rod 38 inserted at the joint 30 was placed around a mold 46 with the rod 38 positioned in a groove 52 and inserted into the locating hole 56. A jacket 60 was placed around the canvas cloth 22. The subassembly was then placed into a vulcanizing system and heated at a temperature of 153° C. at an external pressure of 9.0 kg/cm$^2$ for 10 minutes. The subassembly was then removed from the vulcanizing system and cooled with water on the inside of the mold 46 to produce a pre-mold.

The rod 38 was then removed form the joint 30 and the glass fiber cord 18, described above, was wrapped over the canvas cloth 22. The rubber layer made from hydrogenated nitrile rubber, was then wound around the mold 46. This entire subassembly was then vulcanized in conventional manner after which individual belts 10 were cut from the belt sleeve. The resulting belts 10 were a 105S8M19 type, with 105 STPD teeth, a width of 19.1 mm, and a tooth pitch of 8 mm.

The joints 30 were macroscopically inspected with no evidence of rubber bleeding at the joints 30 seen.

The joint 30 was not significantly embedded into the belt teeth 20. The thread 32 used at the joint 30 was not significantly elongated and as a result no significant rubber bleeding was seen through the joint 30.

The belts 20 were subjected to a high load running test and the running time before cracking in the belt teeth 20 was determined. The test system had a three shaft construction with a drive pulley having 21 teeth, a driven pulley having 21 teeth, and an idler pulley having 21 teeth. The belts 10 were trained around the pulleys such that the driven pulley was engaged by 6 belt teeth. The belts 10 were run at an ambient temperature of 120° C. with the driving pulley operating at 6,000 rpm. The driven pulley had a load of 7 hp. On the average, the running time before cracking of the teeth 20 was 490 hours.

COMPARATIVE SAMPLE 1

A rod was inserted at a joint on a cylindrical canvas cloth. The cloth was placed around a mold so that the rod was positioned circumferentially at a mold groove. The rod was removed. The same load carrying cord construction, as in Inventive Example 1 above, was wrapped over the canvas cloth on the mold. A rubber sheet of hydrogenated nitrile rubber was in turn wrapped around the mold. This entire subassembly was vulcanized in the same manner as Inventive Example 1 and the resulting vulcanized belt sleeve was cut into belts having a predetermined width.

The appearance of each joint was macroscopically inspected. The joints in some belts were darkened to some degree, indicating bleeding of rubber through the joint. In the same belt running test, the average time before belt cracking occurred was 400 hours.

The high load testing of the Inventive Example 1 revealed that the belts 10 were not cracked at the joint 30 and showed a longer running time before cracking than the Comparative Sample 1.

INVENTIVE EXAMPLE 2

The same canvas cloth, rod 38, and load carrying cord 18 as used in Inventive Example 1 were prepared. The canvas cloth 22 with the rod 38 inserted was placed around the mold 46 such that the rod 38 was in one of the mold grooves 52. A hot plate 62 on a pressing machine 64 was heated to 153° C. and pressed against the rod 38 to produce a pre-mold.

After the pre-mold was cooled, the rod 38 was removed. Glass fiber cord 18 was wrapped around the pre-mold followed by a rubber sheet 72 made from hydrogenated nitrile rubber. This entire assembly was vulcanized in conventional manner and the vulcanized belt sleeve then cut into belts 10 having a predetermined width. The resulting belts 10 had a size identified as 105S8M19 with 105 STPD teeth, with the belt having a width of 19.1 mm and the tooth pitch being 8 mm.

The joints 30 were macroscopically inspected, with no visible rubber bleeding found in the belts 10.

INVENTIVE EXAMPLE 3

The canvas cloth 22 with the rod 38 inserted at the joint 30 was placed around the mold 46 with the rod 38 positioned in a groove 52 on the mold 46. Using a pressing machine 64, the rod 38 was urged into the groove 52 with the pressing plate 62 at room temperature. The rod 38 was then separated from the mold 46. Glass fiber cord 18 was wrapped around the canvas cloth 22 whereafter a rubber sheet 72 made from hydrogenated nitrile rubber was formed around the mold 46. This entire subassembly was vulcanized, with the resulting vulcanized belt sleeve being cut into belts 10 having a predetermined width. The resulting belts 10 were a 105S8M19 belt type with 105 STPD teeth, with the belts having a width of 19.1 mm and the teeth having a pitch of 8 mm.

The joints 30 were inspected macroscopically, with no rubber bleeding through the joints 30 identified.

COMPARATIVE SAMPLE 2

A rod was inserted into a joint of a cylindrical canvas cloth. The cloth was fit around a mold so that the rod was positioned circumferentially at a mold groove. The rod was removed. Glass fiber as used in Comparative Sample 1 was wrapped around the canvas cloth. A rubber sheet, made from hydrogenated nitrile rubber was formed around the mold. The entire subassembly was vulcanized in the same manner as explained for Comparative Sample 1, and the resulting, vulcanized belt sleeve was then cut into belts of a predetermined width.

The joints in the individual belts were then macroscopically inspected. The joints in some of the belts was darkened to a certain extent, indicating that rubber had bled out of the joint.

With the invention, the joints 30 can be accurately located on the belt 10. The invention makes it possible to maintain the integrity of the joint 30. As a result, bleeding of rubber through the joint 30 during belt formation may be controlled so that the appearance of the belt 10 is maintained. A belt having canvas cloth 22 with a high integrity joint is not prone to premature cracking or creaking.

The foregoing disclosure of specific embodiments is intended to be illustrative of the broad concepts comprehended by the invention.

We claim:

1. A method of forming a belt/belt sleeve having a length and teeth spaced lengthwise of the belt/belt sleeve, said method comprising the steps of:
    providing a cylindrical cloth having a sewn joint;
    providing a mold having an axis, a circumference, and a plurality of axially extending grooves spaced around the circumference of the mold;
    extending the cylindrical cloth around the mold;
    providing a rod;
    pressing the rod against the cloth at the sewn joint so as to urge the sewn joint into one of the axially extending grooves;
    separating the rod from the cloth; and
    forming at least one belt component around and directly against the cloth on the mold after the rod is separated from the cloth.

2. The method of forming a belt/belt sleeve according to claim 1 wherein the step of forming at least one belt component around the cloth comprises the step of wrapping a load carrying cord around the cloth.

3. The method of forming a belt/belt sleeve according to claim 1 wherein the step of forming at least one belt component around the cloth comprises the steps of applying unvulcanized rubber around the cloth and vulcanizing and molding the unvulcanized rubber.

4. The method of forming a belt/belt sleeve according to claim 1 wherein the step of providing a rod comprises the step of providing an elongate rod having a rigid construction.

5. The method of forming a belt/belt sleeve according to claim 4 wherein the step of providing a rod further comprises the step of providing a rod having a rounded cross section and an angled tip portion.

6. The method of forming a belt/belt sleeve according to claim 1 wherein the sewn joint is formed by thread and further comprising the step of placing the rod between the thread and the cloth before pressing the rod against the cloth.

7. The method of forming a belt/belt sleeve according to claim 1 wherein the step of forming at least one belt component comprises the steps of applying unvulcanized rubber around the cloth, placing a vulcanizing jacket around the mold with the unvulcanized rubber around the cloth, and vulcanizing the unvulcanized rubber.

8. The method of forming a belt/belt sleeve according to claim 3 wherein the step of vulcanizing the unvulcanized rubber comprises the step of heating the unvulcanized rubber under pressure.

9. The method of forming a belt/belt sleeve according to claim 1 wherein the step of pressing the rod comprises the step of pressing the rod through the use of a pressing machine.

10. The method of forming a belt/belt sleeve according to claim 9 further including the step of heating the rod at least one of a) prior to pressing the rod against the cloth and b) as the rod is pressed against the cloth.

11. The method of forming a belt/belt sleeve according to claim 1 wherein the mold has a locating hole and further including the step of directing the rod into the locating hole.

12. The method of forming a belt/belt sleeve according to claim 11 further including the step of directing the rod axially within the one of the axially extending grooves and within the locating hole.

13. The method of forming a belt/belt sleeve according to claim 6 wherein the step of providing a cylindrical cloth comprises the step of providing a cylindrical cloth which has a resistance value for the rod being inserted between the thread and the cloth of 1–5 kg.

14. The method of forming a belt/belt sleeve according to claim 1 wherein the step of providing a rod comprises the step of providing a rod that comprises one of a metal wire and a resin.

15. The method of forming a belt/belt sleeve according to claim 1 wherein the step of providing a rod comprises the step of providing a rod having a length that is approximately equal to the axial extent of the one of the axially extending grooves.

16. The method of forming a belt/belt sleeve according to claim 1 wherein the one of the axially extending grooves has a cross-sectional area, the rod has a cross-sectional area, and the step of providing a rod comprises the step of providing a rod having a cross-sectional area equal to from 5–50% of the area of the one of the axially extending grooves.

17. The method of forming a belt/belt sleeve according to claim 1 further including the step of heating the cylindrical cloth with the rod against the cloth at the sewn joint before separating the rod from the cloth.

18. The method of forming a belt/belt sleeve according to claim 17 wherein the step of hearing the cylindrical cloth comprises heating the cylindrical cloth to a temperature of between 150–165° C.

* * * * *